(12) United States Patent
Cutler et al.

(10) Patent No.: US 8,003,042 B2
(45) Date of Patent: Aug. 23, 2011

(54) TOUGHENED SILICON CARBIDE AND METHOD FOR MAKING THE SAME

(75) Inventors: Raymond Ashton Cutler, Bountiful, UT (US); Roger Marc Flinders, Taylorsville, UT (US); Darin Ray, Centerville, UT (US)

(73) Assignee: Ceramatec, Inc., SLC, UT (US)

( * ) Notice: Subject to any disclaimer, the term of this patent is extended or adjusted under 35 U.S.C. 154(b) by 0 days.

(21) Appl. No.: 11/469,407

(22) Filed: Aug. 31, 2006

(65) Prior Publication Data

US 2008/0093779 A1 Apr. 24, 2008

Related U.S. Application Data

(60) Provisional application No. 60/787,717, filed on Mar. 29, 2006.

(51) Int. Cl.
*B28B 1/00* (2006.01)
(52) U.S. Cl. ........................................ 264/682; 501/154
(58) Field of Classification Search .................. 264/682; 501/154
See application file for complete search history.

(56) References Cited

U.S. PATENT DOCUMENTS

| | | | |
|---|---|---|---|
| 4,004,934 A | 1/1977 | Prochazka | |
| 4,179,299 A | 12/1979 | Coppola et al. | |
| 4,230,497 A | 10/1980 | Schwetz et al. | |
| 4,354,991 A | 10/1982 | Suzuki et al. | |
| 4,502,983 A | 3/1985 | Omori et al. | |
| 4,564,490 A | 1/1986 | Omori et al. | |
| 4,569,921 A | 2/1986 | Omori et al. | |
| 4,569,922 A | 2/1986 | Suzuki | |
| 4,829,027 A | 5/1989 | Cutler et al. | |
| 5,298,470 A | 3/1994 | Chia et al. | |
| 5,372,978 A | 12/1994 | Ezis | |
| 5,855,841 A | 1/1999 | Trigg et al. | |
| 5,855,842 A | 1/1999 | Trigg et al. | |
| 6,531,423 B1 | 3/2003 | Schwetz et al. | |
| 6,680,267 B2 | 1/2004 | Pujari et al. | |
| 6,762,140 B2 | 7/2004 | Pujari et al. | |

OTHER PUBLICATIONS

Alliegro et al, "Pressure Sintered Silicon Carbide," J. Am. Ceram. Soc., 39 [11] 386-89 (1956).*
Bocker et al, "Sintering of Alpha Silicon Carbide with additions of Aluminum," Pow. Met., 11 83-85 (1979).*
Chia et al, "High-Toughness Silicon Carbide," Ceram. Eng. Soc. Proc., 12, 1845-61 (1991).*
Padture et al, "In Situ-Toughened Silicon Carbide," J. am. Ceram. Soc., 77[2] 519-23 (1994).*
Zhou et al, "Thermal conductivity of silicon carbide densified with rare-earth oxide additives," J. of the European Ceram. Soc., vol. 24, Issue 2, 8th International Conference on Ceramic Processing, 2004, pp. 265-270, ISSN 0955-2219, DOI: 10.1016/S0955-2219(03)00236-X.*

(Continued)

*Primary Examiner* — Matthew J Daniels
*Assistant Examiner* — Russell J Kemmerle, III
(74) *Attorney, Agent, or Firm* — David Fonda

(57) ABSTRACT

Pressureless sintering of silicon carbide with fracture toughness in excess of about 4 MPa-m$^{1/2}$ as measured by the single-edge precracked beam (SEPB) technique while maintaining a density greater than 3.1 g/cc for compositions with SiC greater than about 94 wt. % is made possible through the use of metallic Al to promote sintering and grain growth. Boron and carbon may be used as traditional sintering aids, with nitrogen to suppress grain growth, and additions of yttrium and/or lanthanide elements to promote intergranular fracture.

42 Claims, 8 Drawing Sheets

OTHER PUBLICATIONS

"Standard Test Methods for Detrmination of Fracture toughness of Advanced Ceramics at Ambient Temperature", *Annual Book of Standards, ASTMC*, Philadelphia, PA 1999, (1999),641-672.

Flinders, et al., "High Toughness Silicon Carbide as Armor", *J. Am. Ceram.Soc. 88* [8], 2217-2226 (2005), (20005),2217-2226.

Flinders, et al., "Microstructural Engineering of the Si-C-Al-O-N System", *Ceram Trans*, 178,63-78 (2005),63-78.

Flinders, et al., "Toughness-hardness Trade Off in Advanced SiC Armor", *Ceram Trans 151*, 37-48, (2003),37-48.

Mori, et al., "Synthesis and Magnetic Properties of Binary Boride REB25 Compounds", *J. Phys. Condens. Matter*: 13[20],1, 423-430 (2001), 423-430.

Pabit, et al., "Grain Boundary Chemistry of SiC-Based Armor", *Ceram. Eng. Sci. Proc.* 27[7], 2006.

Ray, D., et al., "Effect of Room-Temperature Hardness and Toughness on the Ballistic Performance of SiC-Based Ceramics", *Ceram. Eng. Sci. Proc.*, 26[7], 131-42 (2005),131-142.

Ray, et al., "Hardness/Toughness Relationship for SiC Armor", *Ceram. Eng. Sci. Proc. 24*[3], 401-410, (2003),401-410.

Griffin, International Search Report for PCT/US07/07522 sent Mar. 11, 2008, 1-2.

Griffin, Written Opinion for PCT/US07/07522 sent Mar. 11, 2008,1-6.

\* cited by examiner

TOUGHENED SILICON CARBIDE AND METHOD FOR MAKING THE SAME

CROSS-REFERENCE TO RELATED APPLICATIONS

This application claims the benefit of U.S. Provisional Application No. 60/787,717 filed Mar. 29, 2006.

BACKGROUND OF THE INVENTION

1. Field of the Invention

The present invention relates to silicon carbide (SiC) densified to a state of closed porosity. The present invention provides methods for forming silicon carbide articles having enhanced fracture toughness without the need for powder beds, gaseous overpressure, sealed crucibles, or other common methods used to limit volatilization.

2. The Prior Art

Prochazka (U.S. Pat. No. 4,004,934) demonstrated that it was possible to sinter SiC without applied pressure by using small additions of boron (B) and carbon (C). His work using cubic SiC was quickly followed by results at The Carborundum Company (U.S. Pat. No. 4,179,299) showing the hexagonal polytypes could also be used as starting materials using the same boron and carbon additives.

Schwetz and Lipp (U.S. Pat. No. 4,230,497) substituted aluminum (Al) for boron, and suggested that aluminum and carbon were superior sintering additives to boron and carbon. U.S. Pat. No. 4,230,497 disclosed a predominantly transgranular fracture mode, which also typically occurs for the Prochazka material.

These silicon carbide materials had their shortcomings, however. All have fracture toughness values of only about 2.5 $MPa \cdot m^{1/2}$ when measured by the single-edge precracked beam (SEPB) technique, as described in ASTM C 1421-99 (Standard Test Methods for Determination of Fracture Toughness of Advanced Ceramics at Ambient Temperature. pp. 641-672 in 1999 Annual Book of Standards, ASTM, Philadelphia, Pa., 1999) incorporated herein by reference.

Suzuki, et al. (U.S. Pat. No. 4,354,991) demonstrated the pressureless sintering of SiC using aluminum oxide ($Al_2O_3$) as an additive. Suzuki also had its shortcomings. Due to the reaction between alumina and silicon carbide, which produces SiO, CO, and $Al_2O$ gases, powder beds or external powder was needed to generate such gases to retard the decomposition. One attempt to improve on this approach was to lower the temperature of the liquids through the use of a lanthanide aluminate, such as yttria ($Y_2O_3$) and alumina as taught by Cutler, et al. (U.S. Pat. No. 4,829,027). These materials have higher toughness (about 4 $MPa \cdot m^{1/2}$ when measured by the SEPB technique) due to intergranular fracture, which allows for some crack bridging and other toughening mechanisms not operative for SiC which fractures transgranularly. However, they also have inferior corrosion resistance. Additionally, volatility of off gassing species is still an issue at ambient pressure with this and other liquid phase sintering approaches described to date. This is clearly observed with the early work of Omori, et al. (U.S. Pat. Nos. 4,502,983, 4,564,490, and U.S. Pat. No. 4,569,921) where surface segregation of lanthanide compounds was observed, and desired in some instances, when combining solid state sintering additives (Al, B, and C) with lanthanide oxides or their precursors.

Suzuki (U.S. Pat. No. 4,569,922) added AlN in order to form a solid solution with SiC, as well as yttria in order to get an elongated microstructure, which most likely had a fracture toughness above 4 $MPa \cdot m^{1/2}$ when measured by the SEPB technique. One aspect of this invention is oxygen was desired within the structure. This oxygen, although not specified in the invention, was likely associated with aluminum at grain boundaries and triple points, resulting in intergranular fracture. Elongated grains combined with intergranular fracture gives high fracture toughness. Unfortunately, volatilization was still an issue and gaseous overpressures and/or embedding powders are taught to aid in densification without decomposition.

Ezis (U.S. Pat. No. 5,372,978) showed that equiaxed microstructures could be made with SiC and small additions of AlN. This material, sold under the trade name of SiC—N, by Cercom, Inc. demonstrated good fracture toughness (4.5-5.5 $MPa \cdot m^{1/2}$ when measured by the SEPB technique) and also has oxygen associated with aluminum at many triple points allowing for its intergranular fracture. However, external pressure was necessary for densification to occur.

Chia, et al. (U.S. Pat. No. 5,298,470) used AlN together with lanthanide oxides and demonstrated high fracture toughness. However, this material, sold under the trade name of SX for a time by The Carborundum Company, also required the use of powder beds to control volatilization. Later, Schwetz et al. (U.S. Pat. No. 6,531,423) used a similar composition but controlled weight loss with a small overpressure (between 2 and 5 atmospheres) prior to reaching closed porosity and then a higher overpressure (95 atmospheres) to aid in densification. Trigg, et al. (U.S. Pat. No. 5,855,841 and U.S. Pat. No. 5,855,842) used a CO overpressure to limit volatilization, which is obviously a less desirable approach due to the toxicity associated with carbon monoxide.

Pujari, et al. (U.S. Pat. No. 6,762,140 and U.S. Pat. No. 6,680,267) combined $Y_2O_3$, AlN and/or $Al_2O_3$, with boron and carbon to make liquid phase sintered ceramics. Due to their high secondary phase contents, these compositions have volatile species which results in either high weight loss [with the associated problem of deposition of the volatile species elsewhere in the sintering apparatus] or requires weight loss control through powder beds and/or process control.

Silicon carbide is used in a wide range of applications including seals, nozzles, igniters, armor, substrates, semiconductors, mirrors, filters, and impellers. The high erosion, wear, creep, oxidation and chemical resistance of SiC, as well as its electrical properties make it attractive for many products. However, the inability to sinter higher toughness SiC without powder beds and overpressures limits its use. For example, higher toughness SiC would be advantageous for use in armor due to its ability to take multiple hits, as demonstrated by SiC—N. The inability to make this material via a pressureless sintering route makes the material more expensive. Despite the ability to use pressure to densify a diverse range of materials by tailoring their microstructures (see Flinders, et al., "Microstructural Engineering of the Si—C—Al—O—N System," *Ceram. Trans.*, 178, 63-78 (2005), incorporated herein by reference) pressureless sintering of these same compositions is elusive due to the difficulty in sintering this covalently bonded material.

Flinders et al "High Toughness Silicon Carbide as Armor" *J. Am. Ceram. Soc.*, 88[8], 2217-2226 (2005) (incorporated herein by reference) disclosed the use of Al—$Y_2O_3$ as additives in sintering silicon carbide SiC sintered using 0.5-2 wt % $Y_2O_3$ and 0.42-1.7 wt. % Al metal were shown to have a high density and a high toughness. However, Flinders' process required hot pressing to accomplish sintering.

The applicants have realized that the problems of weight loss encountered with traditional routes are largely due to the pressure of oxygen. While some oxygen is inevitably present and indeed can contribute to the sintering process, use of $Al_2O_3$ or aluminates as the primary source of Al results in too much oxygen being present and hence high weight loss through reaction with the silicon carbide. Provision of Al at least in part in the form of elemental Al enables the use of low quantities of additives, which leads to high SiC contents and consequent high density and low amounts of impurities that might be vulnerable to corrosion. Moving to high silicon carbide contents promotes higher hardness.

It would be an advancement in the art to provide a pressureless sintered silicon carbide-based ceramic with toughness greater than 4 MPa·m$^{1/2}$, as measured by the SEPB technique, and a density greater than about 3.1 g/cc without using powder beds or overpressures to aid in densification to a state of closed porosity.

It would be a further advancement to provide such a SiC-based ceramic where the amount of additives required in order to maximize the corrosion resistance of these SiC-based ceramics, which fracture predominantly intergranularly, is minimized.

It would be yet another advancement to produce such a toughened silicon carbide-based ceramics that can be manufactured economically for use in applications requiring high wear, erosion, and abrasion resistance. It would be yet another advancement to provide such a SiC-based material that could be tailored for use in multi-hit armor, semiconductor substrates, heat exchangers, microchannel devices, mirrors, wear parts, and other devices presently served by lower toughness silicon carbide. SiC-based material and methods for making SiC-based material that provide some or all of these advancements are disclosed herein.

SUMMARY OF THE INVENTION

The present invention provides a method of forming a sintered ceramic body comprising predominantly by weight silicon carbide. The method includes the steps of forming a green body from a mixture comprising the components: SiC; aluminum, at least part of which is in elemental form; a rare earth metal in elemental or combined form; oxygen in a bound form; boron in elemental or combined form; carbon in elemental or combined form; and nitrogen in elemental or combined form. The green body is heated under conditions resulting in a sintered ceramic body comprising 94 wt. % or more SiC, having a density above about 3.1 g/cc, and exhibiting an intergranular fracture mechanism. By "rare earth metal" is meant an element selected from the group Y, La, Ce, Pr, Nd, Pm, Sm, Eu, Gd, Tb, Dy, Ho, Er, Tm, Yb, Lu and mixtures or combinations thereof. By "combined form" is meant that the rare earth metal is in a valency state other than 0.

In one embodiment, a heating step may comprise pressureless sintering. The heating step may be followed by cladless hot isostatic pressing. The method may result in a sintered ceramic body consisting essentially of at least about 94% by weight of SiC. In one embodiment, the ceramic body consists of about 94% to about 99% weight SiC. The ceramic body may also contain between about 0.25% and about 3% by weight of Al. In addition, the ceramic body may contain from about 0.01% to about 1.0% by weight of Y. The ceramic body may include from about 0.1% to about 0.5% by weight of boron and from about 0.25% to about 1.5% by weight of oxygen (O). In one embodiment, the ceramic body includes from about 0.15% to about 1% by weight of nitrogen (N). The ceramic body may have a fracture toughness greater than about 4 MPa·m$^{1/2}$ as measured by the single-edged pre-cracked beam (SEPB) technique.

In one embodiment, lanthanide elements, or combinations of lanthanide elements, may be substituted for all or part of the Y. In this configuration, the present invention allows both high density and high toughness to be obtained without requiring packing powder or gaseous overpressures to limit volatility. In one embodiment, nitrogen is added (in the form of AlN or $Si_3N_4$, or another appropriate form of high-temperature nitrogen) to suppress particle coarsening allowing the powder to actively sinter. Al may provide body a sintering assist, as well as the ability to remove surface oxygen from the silica. It is believed that Al behaves differently as an additive than $Al(OH)_3$ or $Al_2O_3$. In one embodiment, Al is used as a metal even though it ends up at grain boundaries and triple points as an oxide. Yttrium of a lanthanide element may segregate to grain boundaries and promote intergranular fracture.

The method for making the ceramic body described above may utilize carbon concentrations between about 0.25% and about 1% by weight based on the amount of SiC powder and its associated oxygen content. In one embodiment, carbon is added to help remove surface silica from the starting powder to promote sintering. The amount of carbon distributed over the surface of the silicon carbide may be less than is typically used when boron is the only other additive since Al metal is also added and also reacts with surface silica to remove it and promote sintering. In one embodiment, phenolic resins, pyrolyzable binders, or other sources of carbon are used. The SiC surface area after milling may be between about 10 m$^2$/g and about 25 m$^2$/g with a green density of at least about 1.5 g/cc. The silicon carbide can be any mixture of polytypes.

In one embodiment, an isothermal hold at about 1500° C. may be beneficial in removing carbon monoxide. The heating rate prior to the hold may be dictated by the amount of binder, the size of the part, and the temperature uniformity within the furnace. Vacuum, Ar, or He may be used during the initial heating. In one embodiment, when heating above about 1500° C., the cover gas may be primarily Ar or He. The heating rate above about 1500° C. may be as fast as the parts will allow without distortion. The heating rate may be above 100° C./hour. The atmosphere can be flowing or stagnant above 1500° C. The stagnant atmosphere allows volatile species to be retained and placing the parts within a graphite container, as is common industrial practice to hinder boron volatilization, is acceptable. The peak temperature should be high enough to allow optimum densification and can be used to control the grain size. It will generally be between about 1800° C. and about 2200° C. when isothermal hold times of about 15 minutes to about 240 minutes are used. The isothermal hold temperature and the time at temperature can be used to control the grain size, which in turn affects the fracture toughness.

DETAILED DESCRIPTION

High toughness SiC may be obtained using applied pressure, such as by hot pressing. For recent publications see D. A. Ray, R. M. Flinders, A. Anderson, and R. A. Cutler, "Hardness/Toughness Relationship for SiC Armor," *Ceram. Eng. Sci. Proc.*, 24[3], 401-10 (2003); M. Flinders, D. Ray and R. A. Cutler, "Toughness-Hardness Trade-Off in Advanced SiC Armor," *Ceram. Trans.*, 151, 37-48 (2003); M. Flinders, D. Ray, A. Anderson, and R. A. Cutler, "High-Toughness Silicon Carbide as Armor," *J. Am. Ceram. Soc.*, 88[8], 2217-26 (2005), and R. Marc Flinders, D. Ray, A. Anderson and R. A. Cutler, "Microstructural Engineering of the Si—C—Al—O—N System," *Ceram. Trans.*, 178, 63-78 (2005), all of which are hereby incorporated by reference. However, it is challenging to pressureless sinter these same systems to high density due to loss of volatile species, changes in fracture modes, and sluggish sintering kinetics, among other problems. Using applied pressure to obtain high density with oxygen at grain boundaries and triple junctions may result in intergranular fracture and enhanced fracture toughness.

Figure 1:
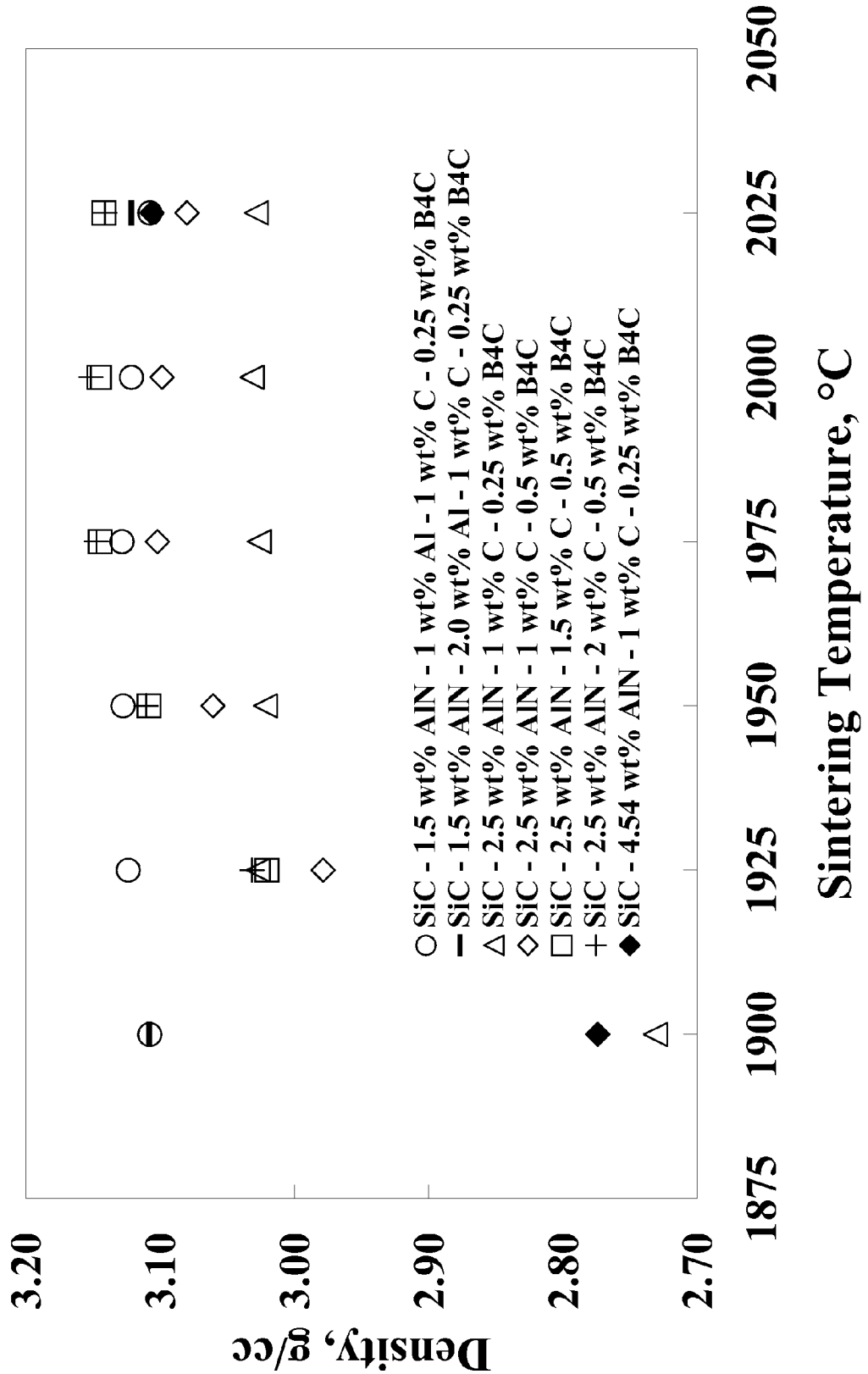
FIG. 1 is a plot of sintered density as a function of sintering temperature for selected compositions sintered in Ar for one hour. All compositions listed are in wt. % additives, with the remainder being SiC.

Pressureless sintering with AlN as the only additive is also difficult. Hot pressing materials using an active powder with a surface area of about 15 m$^2$/g (e.g. Starck UF-15) and the addition of 2.5 wt. % AlN resulted in with densities of 3.21 g/cc and fracture toughness of 3.5 MPa·m$^{1/2}$ as measured by the SEBP technique. When the same material was pressureless sintered, it had a density of 1.84 g/cc after sintering in Ar at 2000° C. for one hour. Since the green density was 1.75 g/cc, little densification occurred. When 0.5 wt. % $B_4C$ was added in addition to the 2.5 wt. % AlN, the density increased to 2.82 g/cc. As shown in FIG. 1, adding both boron and carbon, in addition to the AlN described above, increased the density to well above 3.1 g/cc. None of these materials had fracture toughness above about 3 MPa·m$^{1/2}$ as measured by the SEBP technique.

The addition of Al together with the AlN, C, and $B_4C$, as shown by the SiC-1.5 wt. % AlN-1 wt. % Al-1 wt. % C-0.25 wt. % $B_4C$ composition, also allowed for high density to be achieved over an even wider range of temperatures. The amount of residual O was 0.11 wt. % and N was 0.55 wt. % after sintering at 2000° C., but the toughness was still below about 3.5 MPa·m$^{1/2}$ as measured by the SEBP technique. This was consistent with the mostly transgranular fracture surface for this material.

Figure 2:
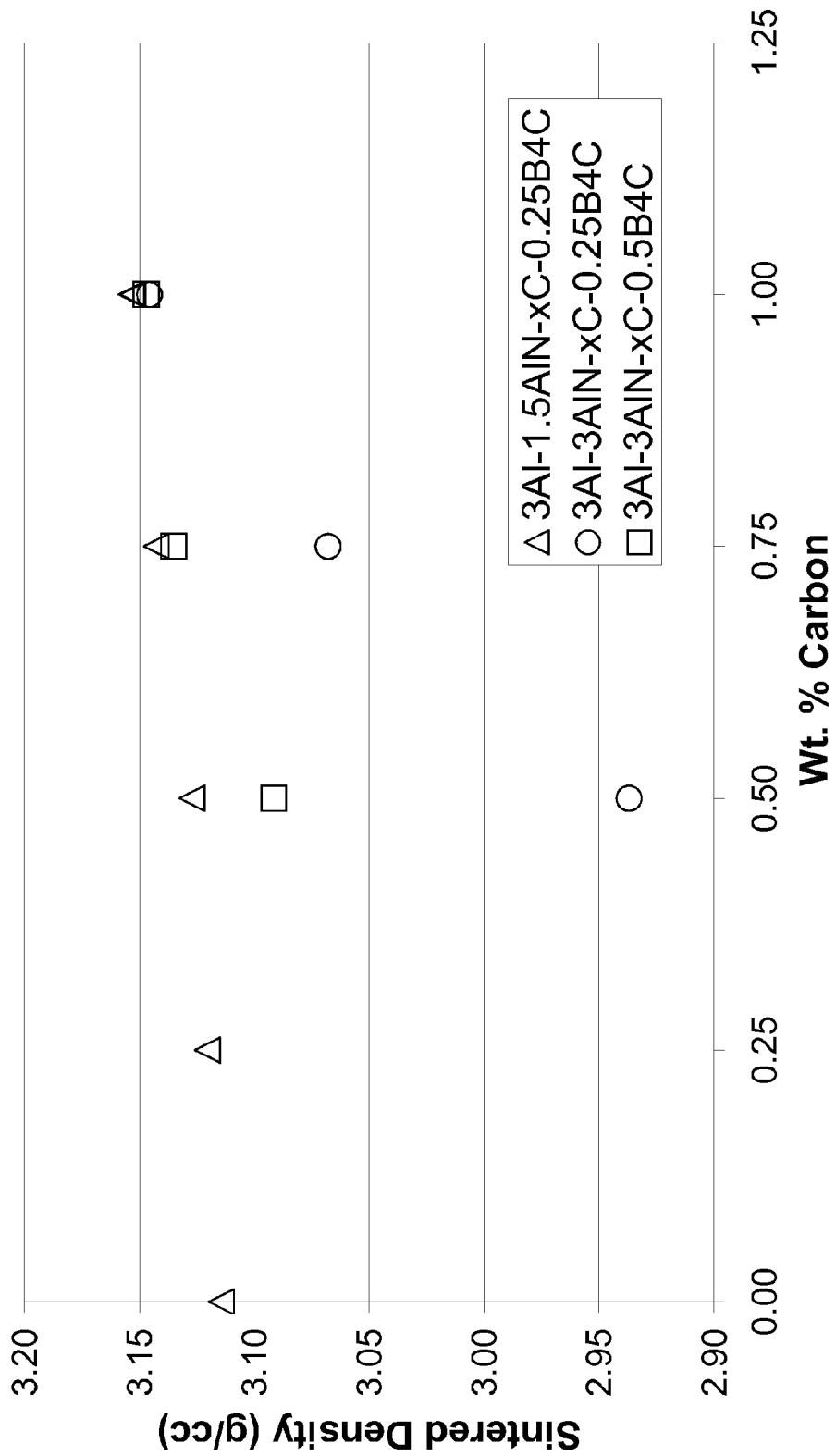
FIG. 2 is a plot of sintered density as a function of wt. % carbon for selected compositions sintered in Ar at 2000° C. for one hour. All compositions listed are in wt. % additives, with the remainder being SiC.
Figure 3:
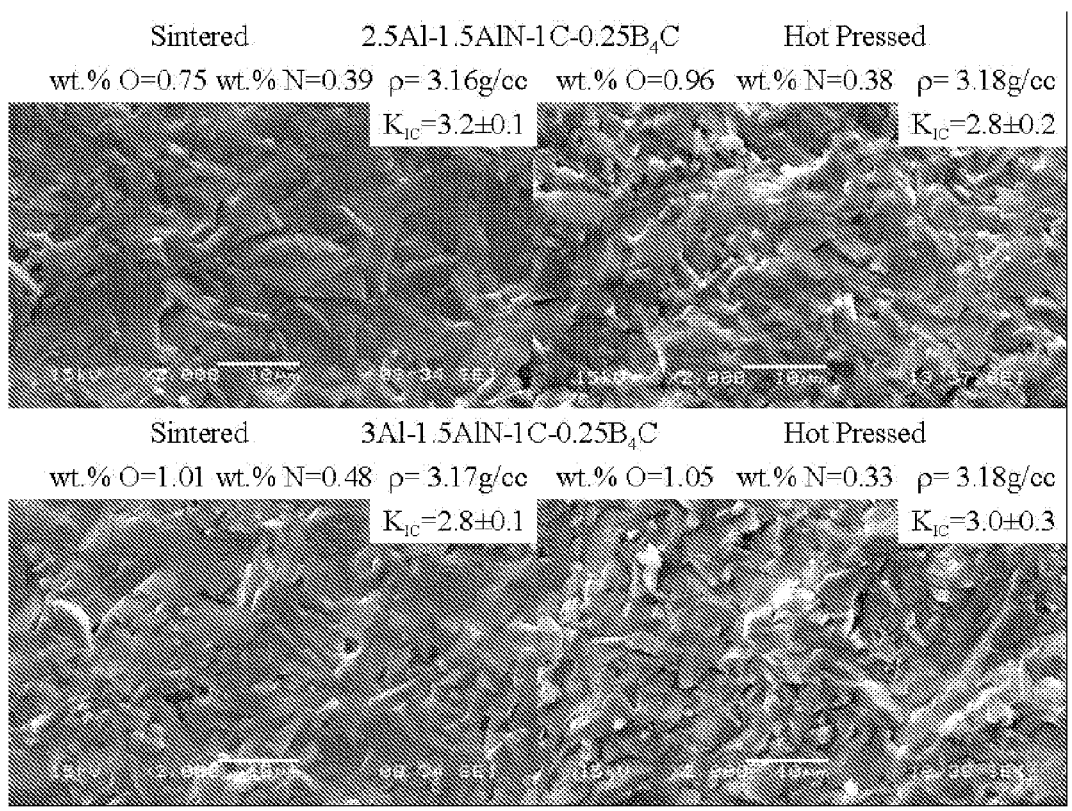
FIG. 3 shows fracture surfaces of two compositions comparing pressureless sintering (left-hand micrographs) at 2000° C. with hot pressing (28 MPa for one hour) at the same temperature. Oxygen and nitrogen contents in the densified compositions are given along with density and SEPB fracture toughness.

When Al contents increased above about 2 wt. %, it was necessary to heat rapidly (33° C./min above 1500° C.) in order to achieve high density. This permitted compositions to be processed without carbon additions, as shown by the density data in FIG. 2. The amount of retained O increased as a result of the increased Al and the rapid heating, but fracture toughness was below about 3.5 MPa·m$^{1/2}$, as measured by the SEBP technique, despite demonstrating the ability to reach high density. FIG. 3 shows a comparison for the same compositions processed by pressureless sintering and hot pressing. The hypothesis that the retention of Al and O at grain boundaries and triple points would result in high fracture toughness was not correct. This was later verified by transmission electron microscopy (see E. Pabit, K. Siebein, D. P. Butt, H. Heinrich, D. Ray, S. Kaur, R. M. Flinders, and R. A. Cutler, "Grain Boundary Chemistry of SiC-Based Armor," *Ceram. Eng. Sci. Proc.*, 27[7], (2006) incorporated herein by reference).

In one embodiment of the present invention, higher fracture toughness is obtained by increasing the amount of intergranular fracture without decreasing the ability to get high density by pressureless sintering. Traditional thinking precludes adding yttria or lanthanide oxides together with boron, since yttrium borides form at high temperatures along with boron oxides (see T. Mori, F. Zhang, and T. Tanaka, "Synthesis and Magnetic Properties of Binary Boride $REB_{25}$ Compounds," *J. Phys: Condens. Matter:* 13[20], L423-30 (2001) incorporated herein by reference). However, Pujari, et al. (U.S. Pat. No. 6,762,140 and U.S. Pat. No. 6,680,267), as mentioned above, used boron and lanthanide oxides in liquid phase sintering SiC with C, AlN, and/or $Al_2O_3$, by adding at least 2 wt. % $Y_2O_3$. Their objective was to induce liquid phase sintering, and this resulted in large amounts of additives, such that the SiC content was below about 94 wt. %. The resulting microstructures showed liquid phase at grain boundaries and required powder beds or control of temperature to limit volatility.

One surprising result of the present invention is the ability to create pressureless sintered SiC with additives in addition to B and C, in minimal quantities to achieve high fracture toughness. In one embodiment, using Al in place of $Al_2O_3$ or $Al(OH)_3$, in SiC compositions containing a source of nitrogen (AlN, $Si_3N_4$, or BN) and boron (B, $B_4C$, or BN), very little yttria is required to change the fracture mode and increase the fracture toughness. Due to the low amount of additives, weight loss is not an issue, and packing powders or gaseous overpressures are not required even at high processing temperatures. It is expected that metallic aluminum reacts with the surface silica on the silicon carbide to form alumina, such that the Al is present only as a transient liquid. Regardless of the mechanisms involved, substituting Al for $Al_2O_3$ or $Al(OH)_3$ changes the sintering behaviour and allows densification at lower additive levels than would have been expected.

Thus, in the present invention, pressureless sintered ceramic bodies containing more than about 94% by weight of SiC can be achieved which appears to be an improvement over the prior art. According to the prior art, it does not appear to have been possible to obtain a pressureless sintered silicon carbide body with a density above 3.1 g/cc, a SEPB fracture toughness above about 4 MPa·m$^{1/2}$ as measured by the single-edged precracked beam technique, when the SiC content was above 94 wt. % without means for controlling volatile species.

In the present invention, density is measured by the Archimedes' method of water displacement, helium pycnometry, or with any accurate assessment of mass and volume. Fracture toughness is measured on 3 mm×4 mm×45 mm SEPB bars as described in ASTM C 1421-99 (Standard Test Methods for Determination of Fracture Toughness of Advanced Ceramics at Ambient Temperature, pp. 641-672 in 1999 Annual Book of Standards, ASTM, Philadelphia, Pa., 1999). A dye, such as any black ink used for ink jet printers, can be vacuum infiltrated into the precrack for 10 minutes and then dried overnight at 60° C. in order to help locate the precrack. The bars are cooled to room temperature and fractured as described in 1421-99. This marking of the precrack allows an easy measurement of the crack length and negates the need for the tedious strain gage measurement described in 1421-99. The fracture toughness values measured this way are conservative since they do not take into account any stable crack growth prior to fracture. Testing hundreds of samples has shown that this method is a good assessment of long-crack fracture toughness. In one embodiment, the pressureless sintered ceramic body may include a density greater than about 3.1 g/cc. In another embodiment, the pressureless sintered ceramic body includes a density of above about 3.15 g/cc. The pressureless sintered ceramic body may also have a fracture toughness of at least 4 MPa·m$^{1/2}$.

Oxygen and nitrogen contents in sintered samples are measured by inert gas fusion/thermal conductivity detection techniques with commercially available analyzers, such as model TC500 from Leco Corporation (St. Joseph, Mich.). A weighed sample, placed in a high-purity graphite crucible, is heated in He at high temperatures where the oxygen, released as CO, and $N_2$ are released. The CO is converted to $CO_2$ and measured with an IR detector, while the $N_2$ is measured due to the thermal conductivity decrease for the gas.

An intergranular fracture mode or mechanism means that at least one-third (33%) of the fracture surface fractures in between grains. The percent of intergranular fracture can be assessed by polishing a SEPB bar, precrackling the bar, etching the precracked bar, and viewing the crack mode over a distance of 25-250 μm, depending on the grain size. It is important to measure a length equivalent to at least 100 grains.

X-ray fluorescence (XRF) or inductively coupled plasma (ICP) chemical analysis, routine methods employed in many laboratories, can be used to assess the Al, Y (or lanthanide elements), and B contents. SiC content can be assessed with x-ray diffraction using Rietveld fitting to quantify secondary phases present. Alternatively, Si content can be measured by XRF and combined C by combustion with an IR detector in order to quantify SiC content. Lanthanide elements are defined as La, Ce, Pr, Nd, Pm, Sm, Eu, Gd, Tb, Dy, Ho, Er, Tm, Yb, and Lu.

The SiC starting powder can be primarily alpha, beta, or mixed polytypes. In some applications, alpha powder is less expensive. The starting SiC powder can have impurities, such as oxygen, carbon, and iron, as is typical of material currently used in the industry. An inexpensive SiC grade can be milled to increase its surface area or a premilled powder can be used. The milled SiC powder should have a surface area above 10 m$^2$/g, and in one embodiment above 15 m$^2$/g. Powders between about 10 m$^2$/g and about 20 m$^2$/g have higher sintering activity. In some embodiments, surface areas above 20 m$^2$/g can be used for this invention.

Boron can be added as elemental boron, as boron carbide, boron nitride, aluminum boride (e.g. $AlB_2$ or $AlB_{12}$), boron oxide, boric acid, or any other form. In one embodiment, boron carbide ($B_4C$) is used for adding boron since fine-grained powders are readily available. In one embodiment boron carbide powder having a mean particle size between 0.5 and 8 μm is used. Since boron is relatively mobile at high temperatures, some boron may be provided within the sintering environment. The amount of boron used in one embodiment is less than 1% by weight of the pressureless sintered ceramic body. In other embodiments, the amount of boron used is between about 0.1% and about 0.5% by weight of the pressureless sintered ceramic body.

Carbon, while not necessarily present in the sintered sample, aids in densification and may be added. Since carbon has a slow diffusion coefficient, it is distributed prior to green densification. Phenolic resins may be used for distributing the carbon. The carbon may be utilized to remove oxygen from the SiC and it is therefore distributed uniformly on the SiC particles by dissolving the carbon and leaving it on the surfaces through evaporation or sublimation. In other embodiments, oxygen in removed by other methods.

Yttrium may be added in the form of yttrium oxide ($Y_2O_3$) since this is readily available and inexpensive due to its use in other industrial processes. In one embodiment, added yttria is less than 20 μm in mean diameter. In other embodiments, the added yttria is less than 5 μm in size. Due to the low volume fraction added, it can be less than 1 μm in size without affecting the green density substantially. Yttrium can also be added as a hydroxide $Y(OH)_3$, a nitrate ($Y(NO_3)_3.xH_2O$), acetate, carbide, nitride, or as elemental Y. The yttrium, in one embodiment is distributed well in the green state and it is generally milled with the starting SiC powder to aid in this process. In one embodiment, the yttrium accounts for less than about 1.5% by weight of the pressureless sintered ceramic body. In other embodiments, the pressureless sintered ceramic body includes between about 0.01% and about 1.0% yttrium by weight. In other embodiments, other lanthanide elements can be used alone or in combination to replace some or all of the yttrium. One surprising result of the present invention is that only minor additions of yttrium and/or lanthanide elements are required to achieve comparatively high levels of fracture toughness and density, which allows sintering without the use of powder beds or overpressures to control volatilization.

Nitrogen may be added as $Si_3N_4$, AlN, or BN. In one embodiment, silicon nitride is used when milling in water since it does not have the same tendency for hydroxide formation as does aluminum nitride. The nitrogen-containing powders may be added as fine powders. In other embodiments a nitrogen-containing powder is added having a particle size of less than about 20 μm in mean diameter. In other embodiments, the particle size is equal to or less than about 5 μm in size. The amount of nitrogen in the pressureless sintered ceramic body may be less than about 2% by weight. In other embodiments, the amount of nitrogen in the pressureless sintered ceramic body is between about 0.15% and 1% by weight. The nitrogen is well distributed in the green state. These powders may also contain oxygen due to their fine particle size. Additional carbon is added to compensate for the free silicon formed as the silicon nitride dissociates at elevated temperatures.

Aluminum may be added as a pure metal. In one embodiment, aluminum is added as a spherical powder. In another embodiment, the aluminum is added in flake form. It may be coated or uncoated, as a multitude of fine aluminum powders are available. If processing occurs in water, then a coarser powder may be used to limit the amount of aluminum hydroxide formation. The amount of aluminum hydroxide formation can also be controlled by mixing or low-energy milling the Al into the SiC slip rather than high-energy milling. The aluminum powder may contain a surface layer of alumina and some additional oxygen may be introduced during processing. In one embodiment, the aluminum particle size is less than 100 µm. In other embodiments, the particle size is less than 50 µm. Powders less than 10 µm in size can also be used. Distribution of the Al may occur in form of liquid upon heating. In one embodiment, the amount of aluminum in the pressureless sintered ceramic body is less than about 5% by weight. In another embodiment, between about 0.25% and about 3% by weight of the pressureless sintered ceramic body is aluminum.

It will be appreciated by those of skill in the art that various amounts of the above mentioned additives in various particle sizes may be used in a variety of combinations to achieve a pressureless sintered ceramic body having a fracture toughness of at least about 4 MPa·m$^{1/2}$ and a density of at least about 3.1 g/cc while maintaining a high percentage of silicon carbide.

The choice of solvent or carrier is dependent on the processing route chosen. This invention can be practiced using traditional ceramic mixing processes including ball milling, vibratory milling, attrition milling, jet milling, and high shear mixing. In one embodiment, the powder is mixed dry. In another embodiment, it is preferable to mix wet in order to distribute the carbon and other additives more uniformly. Non-aqueous solvents limit oxidation of the Al, while water is preferred for production batches for environmental reasons. Milling can occur in liquid nitrogen, although this is a relatively expensive milling approach. Forming methods include tape casting, tape calendaring, slip casing, extrusion, injection molding, pressing, or other means for achieving high green density. Dispersants, binders, and plasticizers are specific to the milling and forming methods, but are similar to those used by those skilled in the art of SiC component manufacturing. The organics can be removed in air, inert gas, or vacuum. If removed in air, care should be taken to limit oxidation of the aluminum and removal of all of the carbon. The organics should be removed in a manner to prevent pore formation, cracks, or other defects from being introduced during this step. The green density after binder removal in one embodiment is at least 1.5 g/cc. In another embodiment, the green density is about 1.7 g/cc. The parts may be bisqued or green machined prior to sintering. Bisquing may be performed in nitrogen, argon, helium, or vacuum at temperatures up to 1600° C.

Sintering can occur in graphite, tungsten, or any furnace capable of reaching temperatures above 1800° C. in reducing environments. In one embodiment, graphite resistance-heated furnaces are used in such applications. The atmosphere may be vacuum below 1500° C. and helium or argon above 1500° C. A stagnant Ar may be used with a slight positive pressure to avoid introduction of air into the furnace chamber. The parts may be placed on graphite, graphite foil, BN, coarse SiC powder, or any non-reactive surface during sintering. It is convenient to put the parts inside a graphite box or enclosure to enable loading of the furnace.

The sintering cycle is best designed around the parts being manufactured, but is typical of those already used for making SiC sintered with boron and carbon, with the exception that the isothermal hold temperature is 50-150° C. lower. If larger grains are desired either temperature or time can be increased. Sintering need not be performed in a batch kiln and the use of a continuous kiln is acceptable. A pressureless sintered density above 3.1 g/cc ensures closed pores, which can be removed with an optional hot isostatic pressing step without cladding the part. Hot isostatic pressing, if used, will typically occur at temperatures above 1800° C. in Ar pressures above 100 MPa.

Finishing operations using grit blasting or diamond tools is optional, since the surface finish of the parts are acceptable for many applications and volatility, which is less than 3 wt. %, and preferably less than 1 wt. %, is low.

The following examples further illustrate this invention.

Examples 1-8

Eight compositions were prepared by using alpha silicon carbide (H. C. Starck grade UF-15), boron carbide (H. C. Starck grade HS), phenolic resin (Durez Corporation grade 7716), aluminum (Valimet grade H3), aluminum nitride (Tokuyama Soda grade F), yttrium oxide (Molycorp grade 5600), and reagent grade acetone. The compositions shown in Table 1 were prepared by making slurries of 350 grams of acetone and appropriate amounts of powdered phenolic resin (with a C content of 50% after pyrolysis), and powders so that each composition contained 300 g of powder based on a post-pyrolysis weight. The slurries were ball milled in one-liter high density polyethylene (HDPE) bottles filled with 1 kg of SiC (solid state sintered with boron and carbon additives) media for 62 hours. The slurry was then stir-dried and screened through an 80-mesh sieve. Following stir-drying, the powders were prepared for pressing by lubing with 2 wt. % polyethylene glycol (Union Carbide grade 8000) and 0.25 wt. % polyvinyl butyral (Solutia grade B-79). Plates (approximately 6 mm×60 mm×60 mm) were uniaxially pressed at about 70 MPa and then isostatically pressed to about 200 MPa. The binders were removed from the plates and the carbon pyrolyzed in an atmosphere of flowing $N_2$ at 600° C. for one hour. Green densities were about 1.75 g/cc for all compositions after this process. The plates were placed on BN-coated graphite foil inside of a graphite crucible without packing powder. Pressureless sintering was performed by evacuating and backfilling the chamber with argon and heating to 1500° C. in 90 minutes. The parts were then heated to the final temperature (2000° C. or 2100° C.) in 30 minutes. Weight loss was less than 2% for all compositions, with linear shrinkages ranging between 17 and 18%. The plates were machined to make bars (3 mm×4 mm×45 mm) used for measurements of SEBP fracture toughness. Knoop hardness (1 kg load), grain size, and aspect ratio as listed in Table 2.

Figure 4:
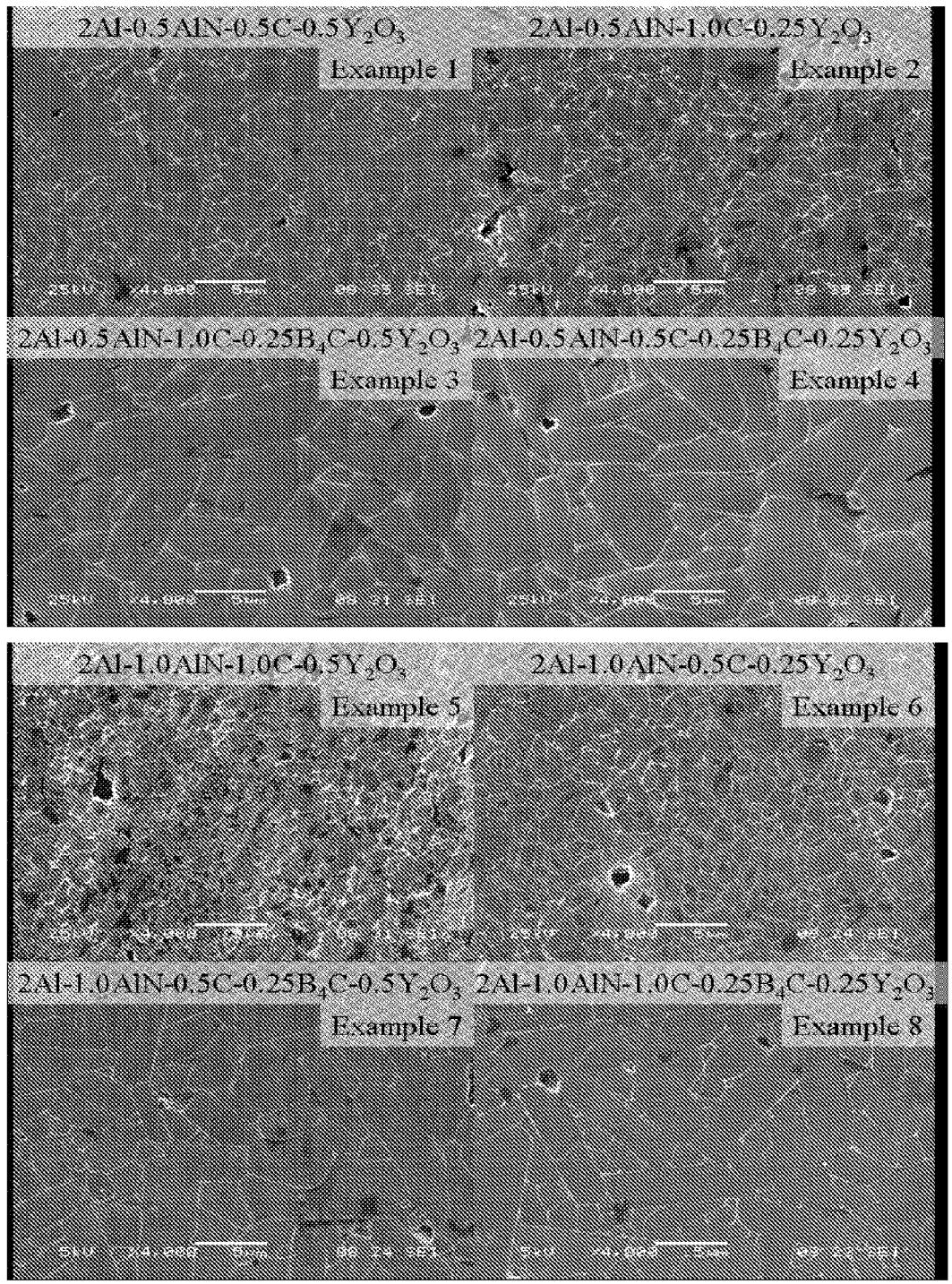
FIG. 4 displays plasma-etched, polished cross-sections of Examples 1-8 after pressureless sintering at 2000° C. for one hour revealing SiC grain size and shape.
Figure 5:
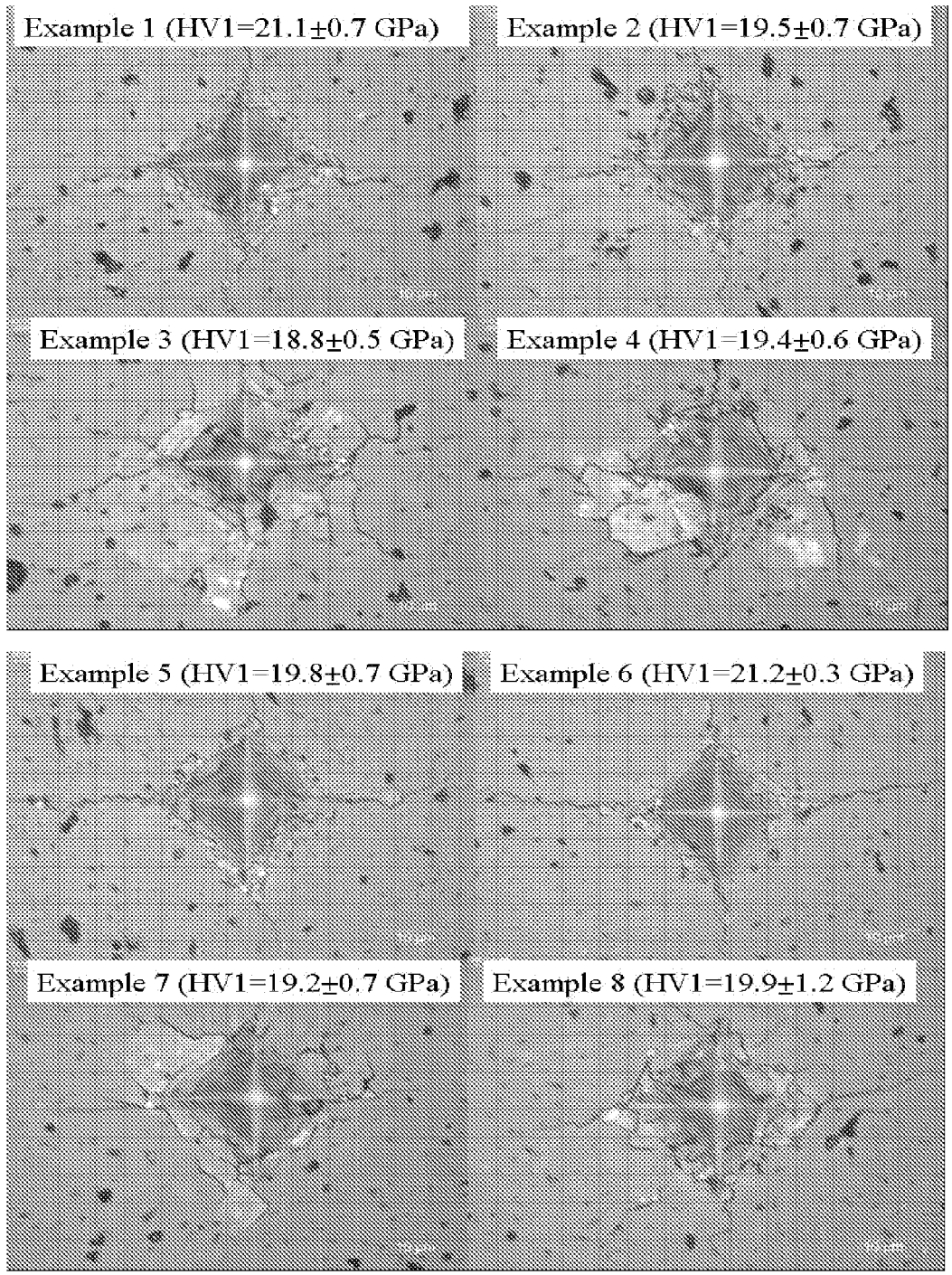
FIG. 5 compares Vicker's hardness indents at one kilogram (HV1) for Examples 1-8 after polishing samples pressureless sintered at 2000° C. for one hour showing the intergranular nature of fracture based on crack patterns around the indents.
Figure 6:
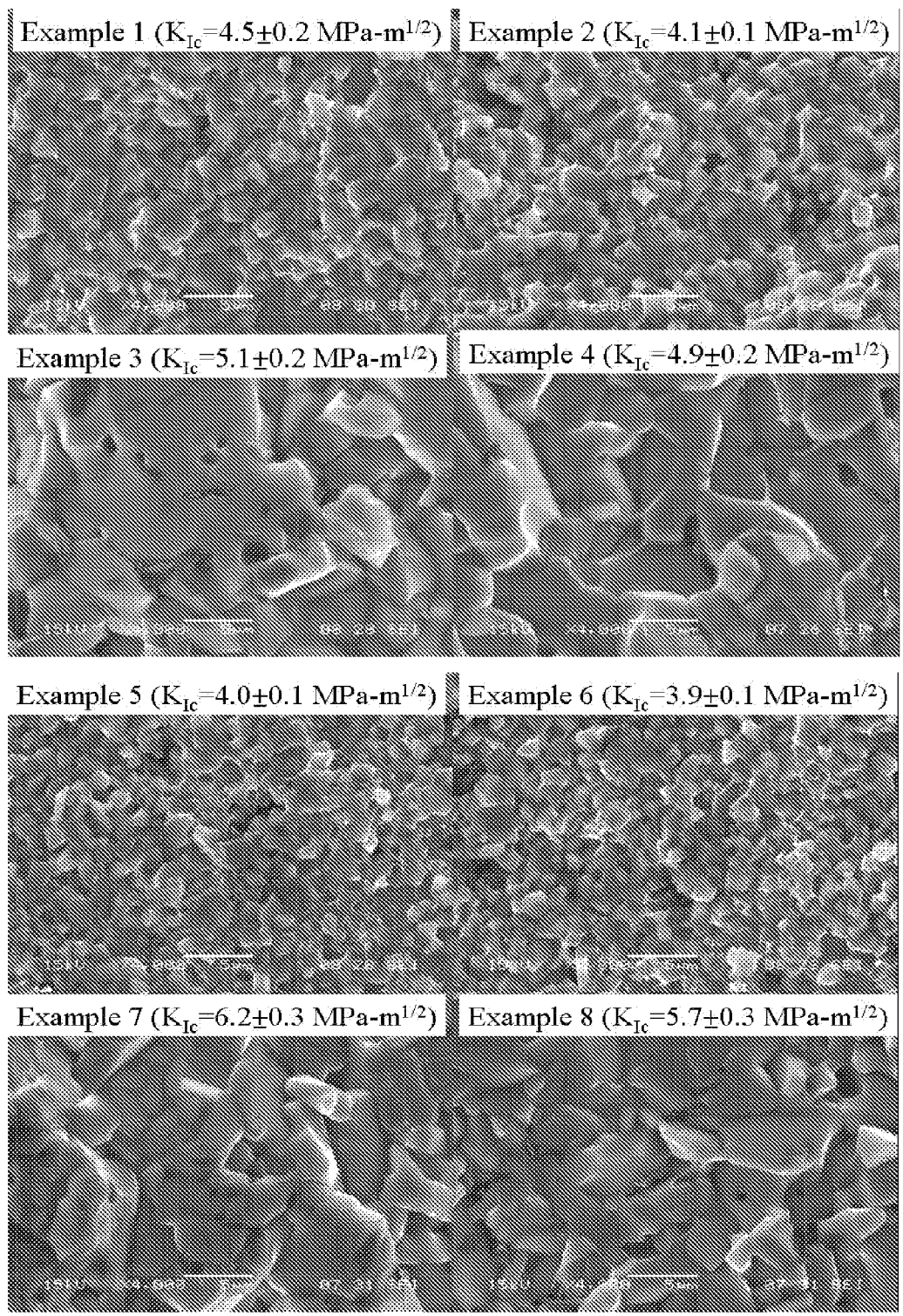
FIG. 6 shows fracture surfaces of Example 1-8 after pressureless sintering at 2000° C. for one hour. The higher fracture toughness, in comparison to FIG. 3, is due to the increased intergranular fracture as a result of the small yttria additions.
Figure 7:
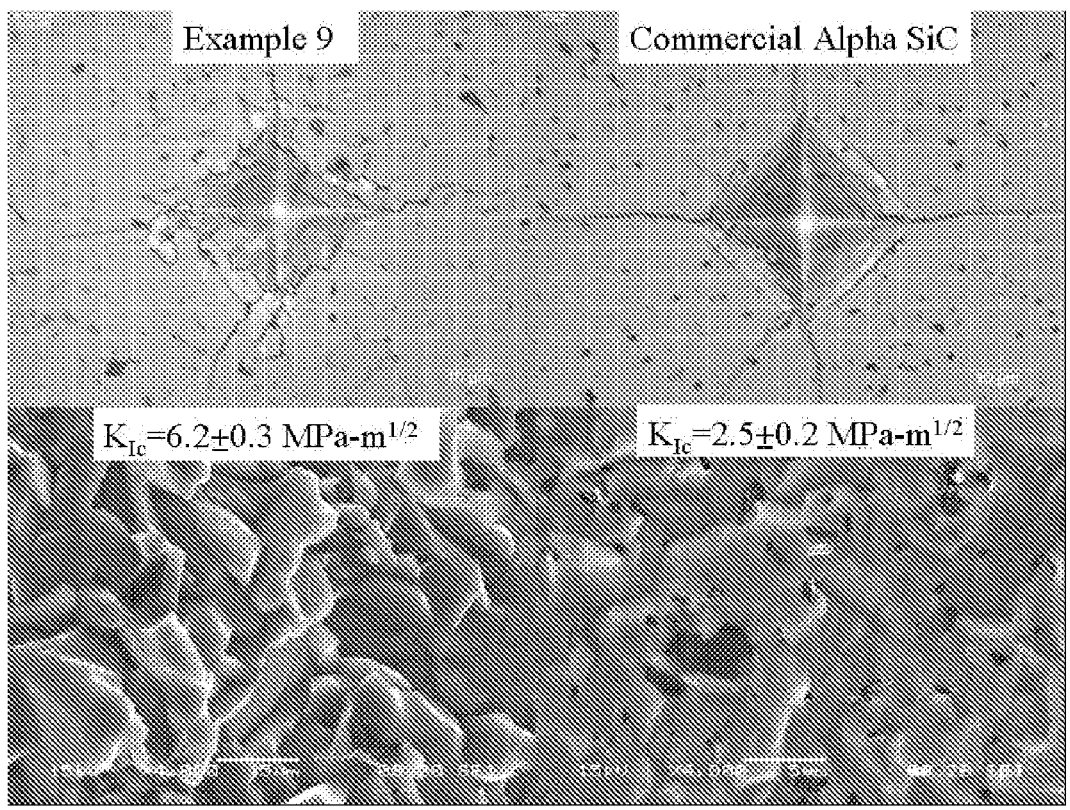
FIG. 7 compares Vicker's hardness indents and fracture surfaces for Example 9 with a high-quality commercially available pressureless sintered SiC material (PS 5000 produced by Morgan Advanced Ceramics). Note that the increase in toughness is due to the dramatic change in fracture mode.

Plasma etched microstructures of the materials sintered at 2000° C./1 hr are shown in FIG. 4. A clear difference in grain size can be seen between materials with and without $B_4C$. It can also be observed that compositions with 1.0 wt. % AlN had smaller grain size compared to similar materials with 0.5 wt. % AlN consistent with nitrogen suppressing particle coarsening. Vickers indents of Examples 1-8 sintered at 2000° C./1 hour are shown in FIG. 5 and demonstrate that the fracture modes range from mixed mode to predominantly intergranular fracture. The same can be seen in SEM micrographs of the fracture surfaces of SEPB bars in FIG. 6.

Example 1-8 show high toughness and density, as well as the specified chemistry at both sintering temperatures.

It is clearly demonstrated that small yttria additions permit increased intergranular fracture to result in improvement of fracture toughness by a factor of two. More importantly, by limiting the amount of yttria added, volatility is suppressed and there is no need to use packing powders or gas overpressures.

TABLE 1

Compositions of Examples 1-8

| | Mass (wt. %) | | | | | |
|---|---|---|---|---|---|---|
| Example | SiC | Al | AlN | C* | $B_4C$ | $Y_2O_3$ |
| 1 | 96.5 | 2.0 | 0.5 | 0.5 | 0.0 | 0.5 |
| 2 | 96.25 | 2.0 | 0.5 | 1.0 | 0.0 | 0.25 |
| 3 | 95.75 | 2.0 | 0.5 | 1.0 | 0.25 | 0.5 |
| 4 | 96.5 | 2.0 | 0.5 | 0.5 | 0.25 | 0.25 |
| 5 | 95.5 | 2.0 | 1.0 | 1.0 | 0.0 | 0.5 |
| 6 | 96.25 | 2.0 | 1.0 | 0.5 | 0.0 | 0.25 |
| 7 | 95.75 | 2.0 | 1.0 | 0.5 | 0.25 | 0.5 |
| 8 | 95.5 | 2.0 | 1.0 | 1.0 | 0.25 | 0.25 |

*After pyrolysis assuming a 50% char yield.

TABLE 2

Characterization of Examples 1-8

| Example | Density (g/cc) | Grain Size (μm) | Aspect Ratio | Hardness* (GPa) | Toughness** (MPa·$m^{1/2}$) |
|---|---|---|---|---|---|
| 2000° C./1 hour | | | | | |
| 1 | 3.13 ± 0.01 | 1.9 ± 0.1 | 3.4 ± 0.6 | 17.7 ± 0.2 | 4.5 ± 0.2 |
| 2 | 3.07 ± 0.01 | 1.7 ± 0.1 | 2.6 ± 0.5 | 16.9 ± 0.3 | 4.1 ± 0.1 |
| 3 | 3.14 ± 0.01 | 6.0 ± 0.3 | 3.3 ± 0.4 | 17.2 ± 0.3 | 5.1 ± 0.2 |
| 4 | 3.15 ± 0.01 | 6.4 ± 0.6 | 3.1 ± 0.6 | 17.8 ± 0.4 | 4.9 ± 0.2 |
| 5 | 3.14 ± 0.01 | 1.4 ± 0.1 | 2.7 ± 0.8 | 17.3 ± 0.2 | 4.0 ± 0.1 |
| 6 | 3.16 ± 0.01 | 1.4 ± 0.1 | 2.4 ± 0.4 | 17.8 ± 0.4 | 3.9 ± 0.1 |
| 7 | 3.17 ± 0.01 | 3.9 ± 0.2 | 4.4 ± 0.9 | 17.8 ± 0.5 | 6.2 ± 0.3 |
| 8 | 3.16 ± 0.01 | 3.4 ± 0.3 | 4.3 ± 1.5 | 17.3 ± 1.2 | 5.7 ± 0.3 |
| 2100° C./0.5 hour | | | | | |
| 1 | 3.13 ± 0.01 | 3.1 ± 0.3 | 4.4 ± 0.7 | 16.9 ± 0.3 | 5.0 ± 0.1 |
| 2 | 3.07 ± 0.01 | 2.3 ± 0.3 | 3.4 ± 0.7 | 15.8 ± 0.6 | 4.6 ± 0.2 |
| 3 | 3.14 ± 0.01 | 6.8 ± 0.6 | 3.4 ± 0.6 | 17.2 ± 0.5 | 5.6 ± 0.2 |
| 4 | 3.16 ± 0.01 | 6.1 ± 0.3 | 4.9 ± 1.1 | 17.7 ± 0.5 | 5.8 ± 0.1 |
| 5 | 3.14 ± 0.01 | 1.7 ± 0.1 | 2.7 ± 0.6 | 16.9 ± 0.6 | 4.4 ± 0.2 |
| 6 | 3.14 ± 0.01 | 1.7 ± 0.2 | 2.9 ± 0.7 | 17.9 ± 0.3 | 4.3 ± 0.2 |
| 7 | 3.15 ± 0.01 | 8.2 ± 0.6 | 3.3 ± 0.6 | 18.1 ± 0.3 | 5.6 ± 0.7 |
| 8 | 3.16 ± 0.01 | 7.0 ± 1.0 | 3.4 ± 1.0 | 17.5 ± 0.3 | 5.5 ± 0.2 |

*Knoop hardness at one Kilogram load.
**SEPB fracture toughness.

Example 9

A composition similar to Example 8 but with 0.5 wt. % $Y_2O_3$ was prepared in larger quantities for pressing into large tiles. The powder (95.25 wt. % SiC, 2.0 wt. % Al, 1.0 wt. % AlN, 1.0 wt. % C, 0.25 wt. % $B_4C$, and 0.5 wt. % $Y_2O_3$) was made by batching slurries of 1500 grams using the same raw materials described in Examples 1-8. The slurries were ball milled in 4 liter HDPE bottle with 4 kg of SiC media for 16-20 hours. The slurries were then stir-dried and screened through a 20-mesh screen. Large plates (~20 cm×~30 cm) were pressed uniaxially at about 35 MPa and then isostatically pressed to 207 MPa. Pressed parts were delubed in an atmosphere of flowing $N_2$ to 600° C. The green density of the plates (~1.73 g/cc) was nearly identical that of the smaller tiles in Examples 1-8.

Large tiles were sintered between BN coated graphite foil, supported between graphite plates and placed nearly upright in a large graphite crucible with a lid. Due to size constraints, the tiles had to be tilted slightly in order to fit into the crucible. Sintering was done by evacuating and backfilling the chamber with argon and heating to 1500° C. in 90 minutes. The parts were then heated to 2000° C. in 30 minutes and held for one hour. Densities of the eight tiles sintered were 3.13±0.01 g/cc. Weight change was 0.5-0.6% for the plates which were approximately 1 cm×15 cm×32 cm after pressureless sintering. Creep flattening of the plates occurred in stagnant Ar by heating to 2000° C. for 0.5 hour under approximately 5 kPa of pressure and was performed in a separate operation without change in density and a 0.2% loss in mass. Bars were ground from one tile and compared with a commercially available pressureless sintered material (Morgan Advanced Ceramic's PS 5000) prepared in an identical manner. Table 3 compares some properties of the two materials. It is very evident that there is a trade-off between hardness and toughness between the two materials. Example 9 is more than twice the SEPB fracture toughness but is not nearly as hard. This trade-off is inherent in the change in fracture mode which occurs between the two materials. The significance of Example 9 is that is demonstrates that large components can be fabricated by pressureless sintering while maintaining high SEPB fracture toughness without the use of powder beds or gaseous overpressures.

TABLE 3

Comparison of Measured Properties of Example 9 and Sintered Alpha SiC

| Code | Density (g/cc) | Weibull Modulus | Strength (MPa) | HK1 (GPa) | HV1 (GPa) | Toughness (MPa·$m^{1/2}$) |
|---|---|---|---|---|---|---|
| Example 9 | 3.14 ± 0.01 | 11.3 | 468 ± 48 | 17.4 ± 0.3 | 19.9 ± 0.9 | 6.2 ± 0.3 |
| PS 5000 | 3.15 ± 0.01 | 8.4 | 452 ± 63 | 20.4 ± 0.3 | 24.2 ± 0.8 | 2.5 ± 0.2 |

Examples 10-16

The compositions shown in Table 4 were prepared in the same manner as Examples 1-8. For Example 16, $Si_3N_4$ (Ube, grade E-10) was substituted for the AlN at the same level of nitrogen as in Example 7, with additional Al added so that the Al contents were fixed for the two compositions. Tiles were pressed, debinderized, and sintered at 1925° C. for 1 hour in an identical manner as described for Examples 1-8. Weight loss was less than 2 wt. % for all samples. The samples were subsequently hot isostatically pressed (HIPed) by heating to 1950° C. and holding for one hour under 200 MPa Ar. Table 5 displays the sintered density, as well as the increased density due to HIPing, with Example 9 included for comparison. These examples demonstrate that post-HIPing can be used to increased density, as well as demonstrate that the nitrogen source can be supplied by silicon nitride instead of aluminum nitride. HIPing coarsened the microstructures and increased the toughness. This is not a consequence of HIPing but rather due to exposure to elevated temperature. Microstructural control is necessary to control toughness regardless of whether the materials go through a post-sintering HIPing cycle.

TABLE 4

Compositions of Examples 10-16

| | Mass (wt. %) | | | | | | |
|---|---|---|---|---|---|---|---|
| Example | SiC | Al | AlN | C* | $B_4C$ | $Y_2O_3$ | $Si_3N_4$ |
| 10 | 95.25 | 2.0 | 1.0 | 1.0 | 0.5 | 0.25 | 0.0 |
| 11 | 96.0 | 1.5 | 1.0 | 1.0 | 0.25 | 0.25 | 0.0 |
| 12 | 95.75 | 1.5 | 1.0 | 1.0 | 0.5 | 0.25 | 0.0 |
| 13 | 95.0 | 2.5 | 1.0 | 1.0 | 0.25 | 0.25 | 0.0 |
| 14 | 94.75 | 2.5 | 1.0 | 1.0 | 0.5 | 0.25 | 0.0 |
| 15 | 95.25 | 2.0 | 1.0 | 1.0 | 0.25 | 0.5 | 0.0 |
| 16 | 95.01 | 2.66 | 0.0 | 0.72 | 0.25 | 0.5 | 0.86 |

*After pyrolysis assuming a 50% char yield.

TABLE 5

Shrinkage, Wt. Loss, and Density for Examples 10-16

| | Shrinkage | Wt. Loss | Density (g/cc) | | SEPB Toughness ($MPa \cdot m^{1/2}$) | |
|---|---|---|---|---|---|---|
| Example | (%) | (%) | Sintered | HIPed | Sintered | HIPed |
| 9 | 17.4 | 0.8 | 3.14 | 3.19 | 6.2 ± 0.3 | 7.2 ± 0.2 |
| 10 | 17.8 | 1.3 | 3.12 | 3.19 | 4.2 ± 0.1 | 4.6 ± 0.1 |
| 11 | 17.9 | 1.4 | 3.12 | 3.19 | 4.5 ± 0.3 | 5.4 ± 0.6 |
| 12 | 17.8 | 1.5 | 3.14 | 3.19 | 4.1 ± 0.3 | 4.3 ± 0.1 |
| 13 | 18.1 | 1.2 | 3.16 | 3.18 | 4.6 ± 0.1 | 5.2 ± 0.1 |
| 14 | 18.0 | 1.2 | 3.14 | 3.19 | 5.1 ± 0.1 | 5.7 ± 0.2 |
| 15 | 18.2 | 1.5 | 3.12 | 3.19 | 4.7 ± 0.7 | 6.1 ± 0.1 |
| 16 | 18.1 | 1.6 | 3.13 | 3.20 | 4.9 ± 0.3 | 6.3 ± 0.3 |

Examples 17-18

Example 17, which is identical in composition to Example 12 was prepared by water-based processing along with Example 18, which was identical in composition to Example 17 except that $Al(OH)_3$ (Alfa Asear grade 12366) was substituted for the Al and $Si_3N_4$ (Ube $Si_3N_4$) for the nitrogen in the AlN. For both examples, 400 grams of deionized water was added to a one-liter HDPE jar filled with one kilogram of SiC media. The pH was adjusted to about 9.5 with ammonium hydroxide and 15 grams of phenolic resin was added (Capitol Resin Corporation grade 720) and the pH was again adjusted to about 9.5 with ammonium hydroxide. Three grams of a lignosulfunate dispersant (Borregaard Industries grade Vanisperse CB) was added prior to adding 574.5 grams of SiC (Starck grade UF-15), 3.0 grams of $B_4C$ (Starck grad HS), and 1.5 grams of $Y_2O_3$ (Molycorp grade 5600). Example 17 was milled for 14 hours with 18 grams of PEG (Union Carbide grade 8000) while Example 18 had 26.0 grams of $Al(OH)_3$ and 3.08 grams of $Si_3N_4$ added along with the same amount of PEG before milling for 14 hours. AlN (6.0 grams of Tokuyama Soda grade F) and Al (9.0 grams of Valimet grade H3) were added to Example 17 and both mills continued to roll for four additional hours. The apparent viscosity of Example 17 ranged from 2470 mPa-s at 10 rpm to 450 mPa-s at 100 rpm while Example 18 had a lower viscosity (1700 mPa-s at 10 rpm to 300 mPa-s at 100 rpm). These slips, which were about 30 vol. % solids, were dried by spraying the slurry into a bath of liquid nitrogen and then freeze drying the powders. The dried powders were screened −80 mesh and processed similar to Examples 1-8. The green density of Example 17 was 1.78 g/cc, which was slightly higher than Example 18 (1.73 g/cc). Sintering occurred as for Examples 1-8 with densities as shown in Table 6. Example 17 sintered to a density greater than 3.1 g/cc but Example 18 did not sinter well as evidenced by the low density and high open porosity. Al is much more effective than $Al(OH)_3$ in achieving high density at these low levels of sintering additives. The fracture toughness for Example 17 was 4.8±0.4 $MPa \cdot m^{1/2}$ when sintered at 2000° C. for one hour.

TABLE 6

Sintered Densities for Water-Based Processing

| | | Density (g/cc) | | | Open Porosity (%) | | |
|---|---|---|---|---|---|---|---|
| Code | Additives | 1900° C. | 2000° C. | 2100° C. | 1900° C. | 2000° C. | 2100° C. |
| Example 17 | Al, AlN | 3.11 | 3.11 | 3.09 | 0.0 | 0.0 | 0.0 |
| Example 18 | $Al(OH)_3$, $Si_3N_4$ | 2.33 | 2.44 | 2.27 | 26.9 | 22.3 | 26.5 |

Examples 19-22

The compositions shown in Table 7 were made using water based processing by adding phenolic resin (CRC 720) to 400 grams deionized water, adjusting the pH by adding 3.0 grams $NH_4OH$, adding $B_4C$ (Starck HS), $Y_2O_3$ (Molycorp 5600), $Si_3N_4$ (Ube E-10), and SiC (Starck UF-15) and milling with 1 kg SiC media inside a one-liter HDPE jar for 4 hours. Al (Valimet H-3), AlN (Tokuyama Soda F), and PEG (Carbowax 8000) were then added and an additional two hours of milling was performed before freeze drying. The materials were pressed to a green density of about 1.75 g/cc and sintered in stagnant Ar for one hour at 2000° C. with results as shown in Table 8. A comparison of Examples 19 and 20 clearly shows that $Si_3N_4$ can be substituted for AlN in water based processing. Examples 19 and 21 compare aluminum at the same concentration and clearly show the benefits of metallic aluminum as compared to aluminum oxide. Not only is densification and fracture toughness improved but the surface segregation of yttria that occurs with the oxide is minimal when using the metal. A comparison of Examples 19 and 22 clearly shows that there is no advantage in using excess yttria, which migrates to the surface at higher concentration.

TABLE 7

Compositions for Examples 19-22

| | | | Mass (wt. %) | | | | | |
|---|---|---|---|---|---|---|---|---|
| Example | SiC | Al | $Al_2O_3$ | AlN | C* | $B_4C$ | $Y_2O_3$ | $Si_3N_4$ |
| 19 | 95.25 | 2.0 | 0.0 | 1.0 | 1.0 | 0.25 | 0.5 | 0.0 |
| 20 | 95.19 | 2.0 | 0.0 | 0.0 | 1.2 | 0.25 | 0.5 | 0.86 |
| 21 | 93.47 | 0.0 | 3.78 | 1.0 | 1.0 | 0.25 | 0.5 | 0.0 |
| 22 | 94.75 | 2.0 | 0.0 | 1.0 | 1.0 | 0.25 | 1.0 | 0.0 |

*After pyrolysis assuming a 40% char yield.

TABLE 8

Density, Weight Loss, and Fracture Toughness for Examples 19-22

| Example | Weight Loss (%) | Density (g/cc) | SEPB Fracture Toughness ($MPa \cdot m^{1/2}$) |
|---|---|---|---|
| 19 | 1.1 | 3.13 | 6.5 ± 0.1 |
| 20 | 1.5 | 3.12 | 6.3 ± 0.1 |
| 21 | 4.1 | 3.08 | 4.8 ± 0.4 |
| 22 | 1.3 | 3.13 | 6.5 ± 0.2 |

Examples 23-28

To further illustrate the uniqueness of this invention comparative compositions (see Table 9) were made using examples from three previous patents. Examples 23 and 24 are batches 2 and 7, respectively from U.S. Pat. No. 6,762,140 to Pujari, et al. Examples 25 and 26 are Examples 3 and 25, respectively, from U.S. Pat. No. 5,298,470 to Chia, et. al. Example 27 is Example 5 from U.S. Pat. No. 4,829,027 to Cutler, et. al. Example 28 is from the present invention.

TABLE 9

Compositions for Examples 23-28

| | | | Mass (wt. %) | | | | | |
|---|---|---|---|---|---|---|---|---|
| Example | SiC | Al | $Al_2O_3$ | AlN | C* | $B_4C$ | $Y_2O_3$ | $Nd_2O_3$ |
| 23 | 86.5 | 0.0 | 6.0 | 0.0 | 3.0 | 0.5 | 4.0 | 0.0 |
| 24 | 86.5 | 0.0 | 3.0 | 3.0 | 3.0 | 0.5 | 2.0 | 2.0 |
| 25 | 95.5 | 0.0 | 0.0 | 2.5 | 0.0 | 0.0 | 2.0 | 0.0 |
| 26 | 97.5 | 0.0 | 0.0 | 2.5 | 0.0 | 0.0 | 0.25 | 0.0 |
| 27 | 86.25 | 0.0 | 8.85 | 0.0 | 0.0 | 0.0 | 4.9 | 0.0 |
| 28 | 96.0 | 2.0 | 0.0 | 1.0 | 0.5 | 0.25 | 0.25 | 0.0 |

*Assumed yield after pyrolysis.

All of the samples were processed in an identical manner using the same raw materials whenever possible. The compositions shown in Table 9 were made using water based processing by adding phenolic resin (CRC 720) to 400 grams deionized water, adjusting the pH to 9.5 using $NH_4OH$, adding $B_4C$ (Starck HS), $Y_2O_3$ (Molycorp 5600), $Al_2O_3$ (Ceralox SPA-0.5), $Nd_2O_3$ (PIDC grade 1030), Al (Valimet H-3), AlN (Tokuyama Soda grade H), PEG (Carbowax 8000) and SiC (Starck UF-15) before milling with 1 kg SiC media inside a one-liter HDPE jar for 24 hours. The compositions were freeze dried, pressed at 100 MPa uniaxially and 200 MPa isostatically before sintering all examples together at either 1900° C. for three hours, 1950° C. for three hours, or 2000° C. for one hour in stagnant Ar after delubing at 600° C. in $N_2$. Results are shown in Table 10.

Figure 8:
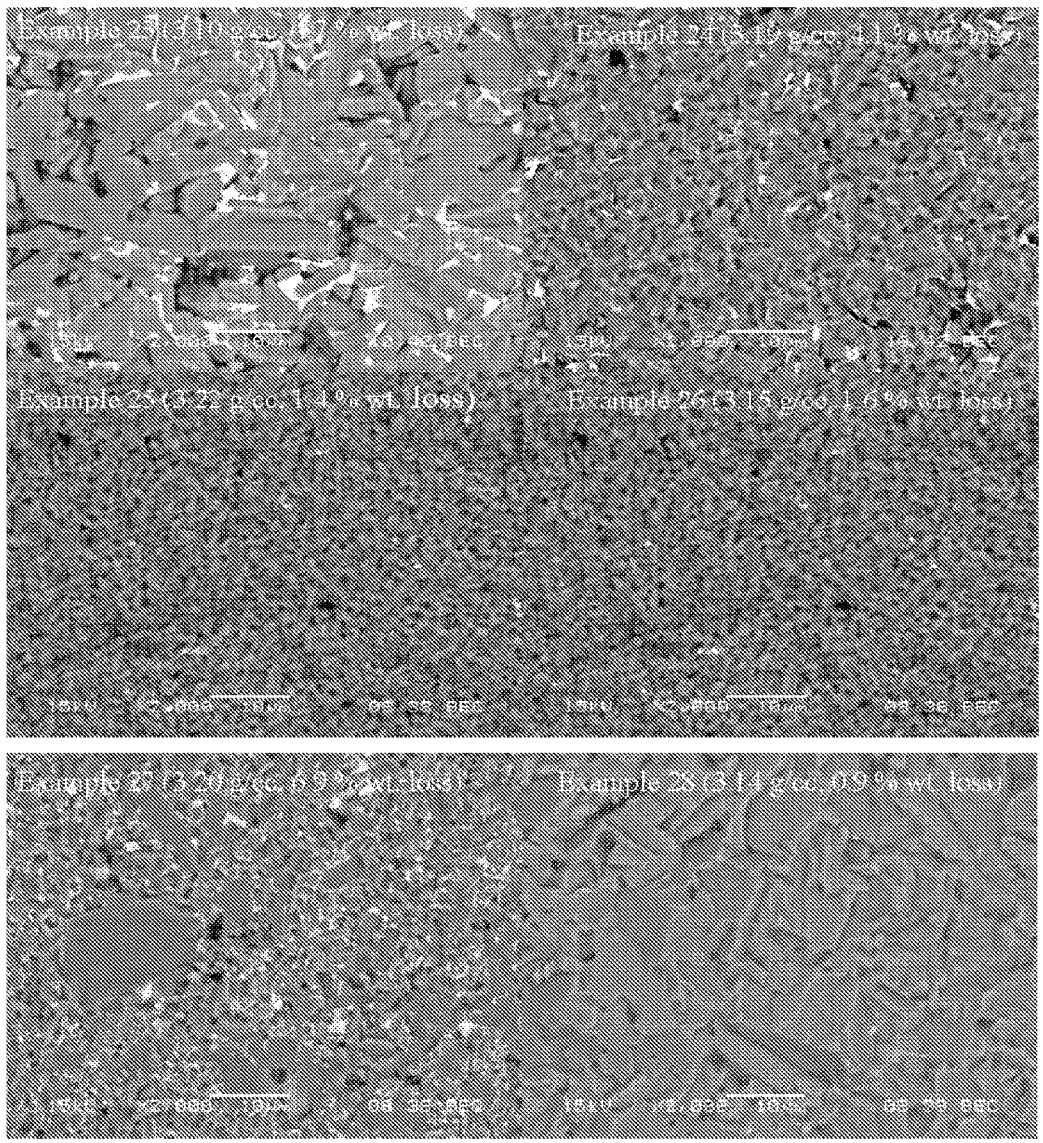
FIG. 8 shows fracture surfaces of Examples 23-28 after pressureless sintering at 1950° C. for three hours.

Fracture surfaces from samples sintered at 1950° C. for three hours are shown in FIG. 8. Examples 23, 24, and 27 suffer from high weight loss, with secondary phases clearly evident in the backscattered electron images. The fine grain size of Examples 24, 25 and 26 results in toughness less than 4 $MPa-m^{1/2}$ as measured by the SEPB technique. Nitrogen is a strong grain growth inhibitor, which is clearly shown in these examples. The toughness of Example 28 is superior to the others due to the number of elongated grains available for crack bridging. The low weight loss and high SEPB fracture toughness of Example 28 clearly distinguish it from the other examples in Table 10. The present invention is clearly unique in the ability to deliver high toughness with low weight loss.

TABLE 10

Sintering Results for Example 23-28

| | Green | Sintered Density (g/cc) | | | Wt. Loss (%) | $K_{1c}$ ($MPa \cdot m^{1/2}$) |
|---|---|---|---|---|---|---|
| Example | Density (g/cc) | 1900° C. | 1950° C. | 2000° C. | 1950° C. | 1950° C. |
| 23 | 1.89 | 3.10 | 3.10 | 3.09 | 4.7 | 3.7 ± 0.2 |
| 24 | 1.89 | 3.10 | 3.19 | 3.18 | 4.1 | 3.6 ± 0.3 |
| 25 | 1.76 | 3.23 | 3.22 | 3.23 | 1.4 | 4.1 ± 0.1 |
| 26 | 1.76 | 3.09 | 3.15 | 3.12 | 1.6 | 3.8 ± 0.1 |
| 27 | 1.85 | 3.19 | 3.20 | 3.19 | 6.9 | 4.6 ± 0.3 |
| 28 | 1.74 | 3.15 | 3.14 | 3.14 | 0.9 | 5.8 ± 0.1 |

TABLE 11

Compositions for Examples 29-33

| Example | SiC | Al | AlN | C* | B₄C | Y₂O₃ |
|---|---|---|---|---|---|---|
| 29 | 96.25 | 2.0 | 1.0 | 0.5 | 0.25 | 0.0 |
| 30 | 96.125 | 2.0 | 1.0 | 0.5 | 0.25 | 0.125 |
| 28 | 96.0 | 2.0 | 1.0 | 0.5 | 0.25 | 0.25 |
| 31 | 95.75 | 2.0 | 1.0 | 0.5 | 0.25 | 0.25 |
| 32 | 95.25 | 2.0 | 1.0 | 0.5 | 0.25 | 1.0 |
| 33 | 94.25 | 2.0 | 1.0 | 0.5 | 0.25 | 2.0 |

*Assumed yield after pyrolysis.

Examples 29-33

The fact that little yttria is necessary to increase fracture toughness is shown by Examples 29-33 made at the same time as Example 28. The compositions are shown in Table 11, with Example 28 added for convenience in seeing its yttria level. Processing of Examples 29-33 was identical to Examples 23-28, with results as shown in Table 12. The level and amount of yttria needed to increase the fracture toughness is likely dependent on the method of distributing the yttrium or lanthanide oxide materials prior to sintering. Note that increased yttria in Examples 29-33 had little effect on density, but the smallest addition of 0.125% was enough to allow increased intergranular fracture, which nearly doubled the fracture toughness.

TABLE 12

Sintering Results for Examples 29-33

| Example | Green Density (g/cc) | Sintered Density (g/cc) 1900° C. | Sintered Density (g/cc) 1950° C. | Sintered Density (g/cc) 2000° C. | Wt. Loss (%) 1950° C. | $K_{1c}$ (MPa·m$^{1/2}$) 1950° C. |
|---|---|---|---|---|---|---|
| 29 | 1.75 | 3.13 | 3.12 | 3.11 | 1.3 | 3.4 ± 0.1 |
| 30 | 1.74 | 3.15 | 3.14 | 3.15 | 0.9 | 6.0 ± 0.3 |
| 28 | 1.74 | 3.15 | 3.14 | 3.14 | 0.9 | 5.8 ± 0.1 |
| 31 | 1.75 | 3.15 | 3.14 | 3.14 | 1.0 | 7.0 ± 0.4 |
| 32 | 1.76 | 3.14 | 3.14 | 3.14 | 0.9 | 6.8 ± 0.1 |
| 33 | 1.76 | 3.14 | 3.14 | 3.14 | 0.9 | 4.9 ± 0.2 |

TABLE 13

Compositions for Examples 34-36

| Example | SiC | Al | AlN | C* | B₄C | Y₂O₃ |
|---|---|---|---|---|---|---|
| 34 | 96.25 | 2.0 | 1.0 | 0.5 | 0.25 | 0.0 |
| 35 | 95.25 | 1.5 | 1.0 | 0.5 | 0.25 | 0.25 |
| 36 | 96.0 | 2.0 | 1.0 | 0.5 | 0.25 | 0.25 |

*Assumed yield after pyrolysis.

Examples 34-36

The importance of intergranular fracture is illustrated further in Examples 34-36. Table 13 lists the compositions, which were processed as 2.4 kg batches in four-liter HDPE jars in a manner similar to Examples 28-33. Examples 34 and 36 are identical in composition in Examples 29 and 28, respectively. Table 14 lists the properties after sintering at 2000° C. for one hour. HK1 and HV1 are the Knoop and Vicker's hardness using one-kilogram loads. It is clear that the ability to fracture intergranularly influences the fracture toughness and is a function of composition.

TABLE 14

| | | Characterization of the Materials | | | | | |
|---|---|---|---|---|---|---|---|
| | Density | Grain Size | Aspect | % Intergranular | Toughness | Hardness(GPa) | |
| Example | (g/cc) | μm | Ratio | Fracture | (MPa√m) | HK1 | HV1 |
| 34 | 3.13 ± 0.00 | 3.9 ± 0.6 | 5.0 ± 1.4 | 20 | 3.4 ± 0.2 | 17.3 ± 0.6 | 20.0 ± 0.8 |
| 35 | 3.13 ± 0.02 | 4.9 ± 0.4 | 2.9 ± 0.5 | 42 | 4.7 ± 0.2 | 16.9 ± 0.3 | 20.6 ± 0.9 |
| 36 | 3.14 ± 0.01 | 4.2 ± 0.4 | 4.8 ± 1.1 | 69 | 7.0 ± 0.2 | 17.9 ± 0.5 | 20.5 ± 1.2 |

Selected examples were sent for chemical analysis, with results as shown in Table 15. ICP was used to determine Al, Y, Nd, Si, and B contents. Oxygen and nitrogen were determined using inert gas fusion/thermal conductivity techniques. Example 24, which is not part of the present invention, clearly has less than 94 wt. % SiC, whereas the other examples clearly have greater than 94 wt. % SiC. Substantial oxygen and nitrogen are retained in the sintered structure

TABLE 15

| | Chemical Analysis of Selected Examples | | | | | |
|---|---|---|---|---|---|---|
| | Chemical Analysis (wt. %) | | | | | |
| Example | Al | Y | Nd | B | O | N |
| 3 | 1.3 | 0.27 | <0.02 | 0.14 | 0.88 | 0.10 |
| 12 | 1.8 | 0.14 | <0.02 | 0.25 | 0.94 | 0.18 |
| 14 | 1.3 | 0.15 | <0.02 | 0.28 | 0.68 | 0.23 |
| 20 | 1.3 | 0.31 | <0.02 | 0.12 | 0.50 | 0.16 |
| 24 | 2.8 | 1.3 | 1.3 | 0.40 | 0.91 | 0.75 |
| 28 | 1.7 | 0.17 | <0.02 | 0.15 | 0.44 | 0.21 |

The above examples are only illustrative to teach how to pressureless sinter SiC to high density with a SEPB toughness greater than 4 MPa·m$^{1/2}$ with density greater than 3.1 g/cc and without the need for powder beds or gaseous overpressures for SiC contents greater than 94 wt. %. While the invention has been described in terms of several specific embodiments, it must be appreciated that other embodiments could readily be adapted by one skilled in the art. For example, one could add other secondary phases to increase toughness, change crystallinity by annealing during cooling, or seed the microstructures to increase the tendency to form elongated grains.

The important point is that low levels of additives limit volatility and when added in the proper manner can double the fracture toughness compared to silicon carbide sintered conventionally with boron and carbon. Process steps such a hot isostatic pressing may be used in addition to or in place of pressureless sintering. It should also be noted that the heating step will result in a change of chemical composition from that of the initial starting materials. Accordingly, the scope of the invention is to be limited only by the following claims.

What is claimed is:

1. A method of forming a sintered ceramic body comprising predominantly by weight silicon carbide, the method comprising the steps of:
   a) forming a green body from a mixture comprising the components:
      SiC;
      aluminum in elemental form;
      a rare earth metal in elemental or combined form;
      boron in elemental or combined form; and
      nitrogen; and
   b) heating the green body under conditions resulting in a sintered ceramic body comprising at least 94 wt. % SiC, having a density above about 3.1 g/cc, and exhibiting an intergranular fracture mechanism.

2. The method of claim 1, wherein the heating step comprises pressureless sintering.

3. The method of claim 1, wherein the heating step comprises cladless hot isostatic pressing.

4. The method of claim 1, wherein the amount of SiC in the mixture is 94 weight % or more.

5. The method of claim 1, wherein the amount of rare earth metal comprises less than about 2.5% by weight of the mixture.

6. The method of claim 5, wherein the amount of rare earth metal comprises less than about 1.5% by weight of the mixture.

7. The method of claim 6, wherein the amount of rare earth metal comprises less than about 1% by weight of the mixture.

8. The method of claim 7, wherein the amount of rare earth metal comprises greater than about 0.01% by weight of the mixture.

9. The method of claim 8, wherein the amount of rare earth metal comprises greater than about 0.05% by weight of the mixture.

10. The method of claim 9, wherein the amount of rare earth metal comprises greater than about 0.1% by weight of the mixture.

11. The method of claim 1, wherein the amount of aluminum comprises less than about 5% by weight of the mixture.

12. The method of claim 11, wherein the amount of aluminum comprises less than about 3% by weight of the mixture.

13. The method of claim 12, wherein the amount of aluminum comprises less than about 1% by weight of the mixture.

14. The method of claim 13, wherein the amount of aluminum comprises greater than about 0.25% by weight of the mixture.

15. The method of claim 1, wherein the amount of aluminum present in elemental form comprises greater than about 50% by weight of the aluminum present.

16. The method of claim 1, wherein the boron is present at least in part as boron carbide.

17. The method of claim 1, wherein the amount of boron comprises less than about 1% by weight of the mixture.

18. The method of claim 17, wherein the amount of boron comprises less than 0.5% by weight of the mixture.

19. The method of claim 18, wherein the amount of boron comprises greater than 0.1% by weight of the mixture.

20. The method of claim 1, wherein the mixture further comprises carbon in elemental or combined form.

21. The method of claim 20, wherein the carbon in elemental or combined form comprises a source of carbon that generates carbon during the heating step.

22. The method of claim 21, wherein the source of carbon is a resin.

23. The method of claim 21, wherein the source of carbon is present in an amount that results in a carbon content of less than about 1% by weight in the sintered ceramic body.

24. The method of claim 1, wherein the nitrogen in combined form is selected from the group consisting of AlN, $Si_3N_4$, BN, and combinations thereof.

25. The method of claim 1, wherein the amount of nitrogen comprises less than about 2% by weight of the mixture.

26. The method of claim 25, wherein the amount of nitrogen comprises less than about 1% by weight of the mixture.

27. The method of claim 26, wherein the amount of nitrogen comprises greater than about 0.1% by weight of the mixture.

28. The method of claim 1, wherein the silicon carbide comprises particles having a surface area greater than about $10\ m^2 \cdot g^{-1}$.

29. The method of claim 1, wherein the heating step comprises pressureless sintering said mixture without powder beds, and without gas pressures above 0.2 MPa, at a temperature between 1800° C. and 2200° C. for a time between 15 minutes and 240 minutes.

30. The method of claim 1, wherein the heating step results in a sintered body having a fracture toughness greater than about 4 $MPa \cdot m^{1/2}$ as measured by the single-edged precracked beam technique.

31. The method of claim 1, wherein the sintered ceramic body has a fracture toughness greater than about 6 $MPa \cdot m^{1/2}$ as measured by the single-edged precracked beam technique.

32. A sintered ceramic body obtained from the process of claim 1.

33. The method of claim 1, wherein the rare earth is present as an oxide with all other components having only surface oxides present due to adsorption.

34. A method of forming a sintered ceramic body comprising predominantly by weight silicon carbide, the method comprising the steps of:
   a) forming a green body from a mixture comprising:
      SiC comprising at least 94 weight percent of the mixture;
      aluminum in elemental form and comprising between about 0.25 and about 5 percent by weight of the mixture;
      rare earth metal in elemental or combined form comprising between about 0.01 and about 2.5 percent by weight of the mixture;
      boron in elemental or combined form comprising between about 0.1 and about 2.5 percent by weight of the mixture;
      carbon such that after application of a heating step the carbon is less than about 1% by weight in the sintered ceramic body; and
      nitrogen in combined form comprising between about 0.1 and about 2 percent by weight; and
   b) heating the green body under conditions resulting in a sintered ceramic body exhibiting an intergranular fracture mechanism.

35. The sintered ceramic body made by the process of claim 34, wherein the density is greater than about 3.0 g/cc.

36. The sintered ceramic body made by the process of claim 34, wherein the density is greater than about 3.1 g/cc.

37. A sintered ceramic body, comprising:
   at least 94 weight percent silicon carbide;
   between about 0.25 and about 3 weight percent aluminum;
   between about 0.01 and about 1.0 weight percent of material selected from the group consisting of periodic table elements Y, La, Ce, Pr, Nd, Pm, Sm, Eu, Gd, Tb, Dy, Ho, Er, Tm, Yb, Lu, and combinations thereof;
   between about 0.1 and about 0.5 weight percent boron;
   between about 0.15 and about 1 weight percent nitrogen;
   having a density above 3.1 g/cc; and
   having a fracture toughness greater than about 4 $MPa \cdot m^{1/2}$ as measured by the single-edged precracked beam technique.

38. The sintered ceramic body of claim 37, further comprising between about 0.1 to about 1.5 weight percent carbon.

39. The sintered ceramic body of claim 37, further comprising less than about 0.4 weight percent of material from the group consisting of periodic table elements Y, La, Ce, Pr, Nd, Pm, Sm, Eu, Gd, Tb, Dy, Ho, Er, Tm, Yb, Lu, and combinations thereof.

40. The sintered ceramic body of claim 37, wherein the SEPB fracture toughness is greater than about 5 $MPa\text{-}m^{1/2}$ as measured by the single-edged precracked beam technique.

41. The sintered ceramic body of claim 37, wherein the SEPB fracture toughness is greater than about 6 $MPa\text{-}m^{1/2}$ as measured by the single-edged precracked beam technique.

42. The sintered ceramic body of claim 37, wherein the density is greater than about 3.15 g/cc.

\* \* \* \* \*